US010832377B2

(12) United States Patent
Lu et al.

(10) Patent No.: US 10,832,377 B2
(45) Date of Patent: Nov. 10, 2020

(54) SPHERICAL COORDINATES CALIBRATION METHOD FOR LINKING SPHERICAL COORDINATES TO TEXTURE COORDINATES

(71) Applicant: ASPEED Technology Inc., Hsinchu (TW)

(72) Inventors: Chung-Yen Lu, Hsinchu (TW); Cheng-Yi Hsu, Hsinchu (TW); Hsin-Yu Chen, Taoyuan (TW)

(73) Assignee: ASPEED TECHNOLOGY INC., Hsinchu (TW)

(*) Notice: Subject to any disclaimer, the term of this patent is extended or adjusted under 35 U.S.C. 154(b) by 127 days.

(21) Appl. No.: 16/240,575

(22) Filed: Jan. 4, 2019

(65) Prior Publication Data
US 2020/0219230 A1 Jul. 9, 2020

(51) Int. Cl.
*G06T 3/40* (2006.01)
*G06T 7/90* (2017.01)
*G06T 11/00* (2006.01)
*G06T 11/60* (2006.01)

(52) U.S. Cl.
CPC .............. *G06T 3/4038* (2013.01); *G06T 7/90* (2017.01); *G06T 11/001* (2013.01); *G06T 11/60* (2013.01)

(58) Field of Classification Search
CPC ....... G06T 3/4038; G06T 7/90; G06T 11/001; G06T 11/60
See application file for complete search history.

(56) References Cited

U.S. PATENT DOCUMENTS

| | | | |
|---|---|---|---|
| 10,104,288 B2 | 10/2018 | Hung | |
| 2004/0075738 A1* | 4/2004 | Burke | G08B 13/19656 348/143 |
| 2007/0036460 A1* | 2/2007 | Koch | H04N 5/23264 382/276 |
| 2008/0012850 A1* | 1/2008 | Keating, III | H04N 13/207 345/419 |
| 2009/0067749 A1* | 3/2009 | Schiewe | H04N 9/3185 382/294 |
| 2015/0229841 A1* | 8/2015 | Zhou | G06K 9/6201 348/37 |
| 2016/0295108 A1* | 10/2016 | Cao | H04N 17/002 |
| 2018/0018807 A1 | 1/2018 | Lu | |
| 2018/0114348 A1 | 4/2018 | Lu | |
| 2019/0197734 A1* | 6/2019 | Briggs | G06T 7/85 |

* cited by examiner

*Primary Examiner* — Syed Haider
(74) *Attorney, Agent, or Firm* — Muncy, Geissler, Olds & Lowe, P.C.

(57) ABSTRACT

A calibration method for linking spherical coordinates to texture coordinates is provided. The method comprises: installing a plurality of lamps forming a horizontal semicircle arc and a rotation equipment located at its circle center; mounting a N-lens camera on the rotation equipment; causing the N-lens camera to spin about a spin axis passing through two ends of the horizontal semicircle arc and capture a plurality of lens images for different spin angles by the rotation equipment; and, determining longitude and latitude coordinates of a plurality of calibration points according to the different spin angles and the texture coordinates of the calibration points in the lens images to create a link between the spherical coordinates and the texture coordinates. Different positions of the lamps respectively represent different latitudes and different spin angles respectively represent different longitudes. Heights of the camera and the lamps are the same.

15 Claims, 19 Drawing Sheets polygon mesh on equirectangle domain equirectangular panoramic image

Triangle mesh modeling a sphere

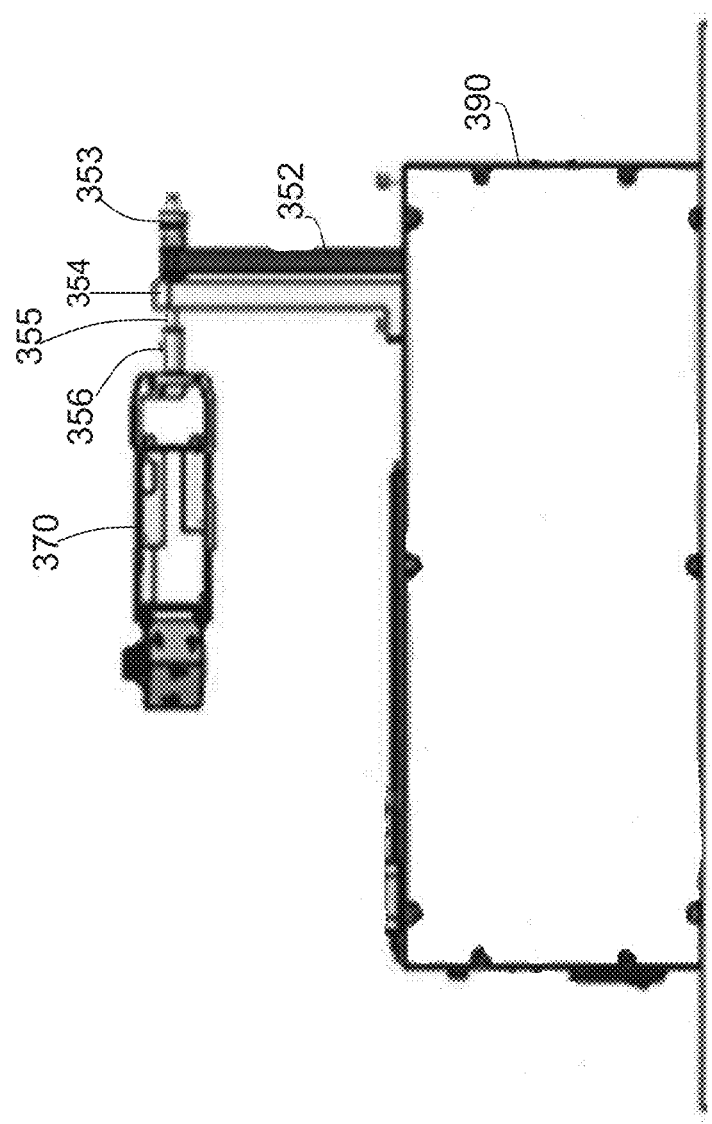

Lens "front face" at 40-degree longitude

SPHERICAL COORDINATES CALIBRATION METHOD FOR LINKING SPHERICAL COORDINATES TO TEXTURE COORDINATES

BACKGROUND OF THE INVENTION

Field of the Invention

The invention relates to panoramic imaging, and more particularly, to spherical coordinates calibration method for linking spherical coordinates to texture coordinates.

Description of the Related Art 360-degree panoramic images, also known as 360-degree panoramic images, full panoramic images, or spherical images, are video recordings of a real-world panorama, where the view in every direction is recorded at the same time, shot using an omnidirectional camera or a collection of cameras. A 360-degree panoramic image covers 360-degree field of view (FOV) horizontally and 180 degree vertically.

An equirectangular video is a commonly projection used in 360-degree videos. A common example of equirectangular projection is a standard world map, which maps the surface of the world (a sphere) onto orthogonal coordinates. That is, equirectangular projection maps the latitude and longitude coordinates of a spherical globe directly onto horizontal and vertical coordinates of a grid. Image distortion is minimal at the equator, and infinite at the poles. The poles (Zenith, Nadir) are located at the top and bottom edge and are stretched to the entire width of the image.

As shown in the example of FIG. 1A, a six-lens camera (not shown) respectively is mounted on the six faces of a cube framework 11 to simultaneously capture a 360-degree view to generate six lens images. In order to store and display conveniently on computer screens, a spherical projection is mapped to an equirectangular panoramic image. Its aspect ratio is chosen to be 2:1, with the horizontal coordinate representing the azimuth angle $\theta \in -\pi \sim +\pi$, and the vertical coordinate representing the elevation angle $\varphi \in -\pi/2 \sim +\pi/2$. FIG. 1B shows an equirectangular panoramic image derived from an equirectangular projection of the six lens images from the six-lens camera. FIG. 2A shows a triangle mesh modeling a sphere surface. The surface of the sphere 12 is modeled by using a triangle mesh as shown in FIG. 2A. The polygon mesh of FIG. 2B is produced by performing an equirectangular projection of the triangle mesh of FIG. 2A.

Spherical coordinates calibration is used to construct a mapping relationship between longitude and latitude coordinates (or the equirectangular coordinates) and the texture coordinates. In a conventional spherical coordinates calibration, the six-lens camera is respectively mounted on the six faces of the cube framework 11 positioned at the center of the sphere 12 as shown in FIG. 1A; the sphere 12 with 2 meter radius (r=2) is drawn in many circles as latitudes and longitudes, whose intersection points are marked as calibration points; the six lenses of the camera capture these calibration points, and the positions of the calibration points on the six lens images are known. Then the mapping relationship between the equirectangular panoramic image and the six lens images are constructed since the view angles of the calibration points and camera coordinates are linked.

However, the conventional calibration scheme has the following drawbacks. First, the cost for building the sphere 12 marked with calibration points is high. Second, a camera holder (not shown) hinders the image capture. Third, it is difficult for the six lenses to position at the sphere center. Fourth, the calibration points that are marked on the sphere surface are fixed and thus it is difficult to change the positions of the calibration points. Fifth, it is impossible to adjust the radius of the sphere 12. Accordingly, what is needed is a calibration method for linking spherical coordinates to texture coordinates to establish a correct mapping relationship between the equirectangular panoramic image and the lens images with a low building cost.

SUMMARY OF THE INVENTION

In view of the above-mentioned problems, an object of the invention is to provide a calibration method for linking spherical coordinates to texture coordinates, which is low-cost, workable, scalable and easy-to-install.

One embodiment of the invention provides a calibration method for linking spherical coordinates to texture coordinates. The calibration method comprises: installing a plurality of lamps forming a horizontal semicircle arc and a rotation equipment located at its circle center; mounting a N-lens camera on the rotation equipment; causing the N-lens camera to spin about a spin axis passing through two ends of the horizontal semicircle arc and capture a plurality of lens images for different spin angles by the rotation equipment; and, determining longitude and latitude coordinates of a plurality of calibration points according to the different spin angles and the texture coordinates of the calibration points in the lens images to create a link between the spherical coordinates and the texture coordinates. Different positions of the lamps respectively represent different latitudes and different spin angles respectively represent different longitudes. Heights of the camera and the lamps are the same. The calibration points in each lens image are associated with the lamps shown in each lens image.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3B shows a profile view of the test equipment in FIG. 3A.

DETAILED DESCRIPTION OF THE INVENTION

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context.

The spherical coordinates calibration method for linking spherical coordinates to texture coordinates of the invention establishes a correct mapping relationship between the longitude and latitude coordinates (or the equirectangular coordinates) and the texture coordinates. A feature of the invention is to arrange a plurality of lamps in the shape of a horizontal semicircle arc with a spinning multiple-lens camera located at its circle center to capture the views of the lamps for different spin angles. The term "stepping angle" refers to an angle that the multiple-lens camera spins about a spin-axis passing through the circle center and two ends of the horizontal semicircle arc at a time. The term "spin angle" refers to an angle that the multiple-lens camera spins about the spin-axis with respect to a reference direction/angle. Stated in another way, the spin angle is the accumulation/sum of the stepping angles from beginning (i.e., the reference direction/angle). The heights of the lamps and the multiple-lens camera are the same. Another feature of the invention is that the number of the lamps and the stepping angle are adjustable.

Figure 1A:
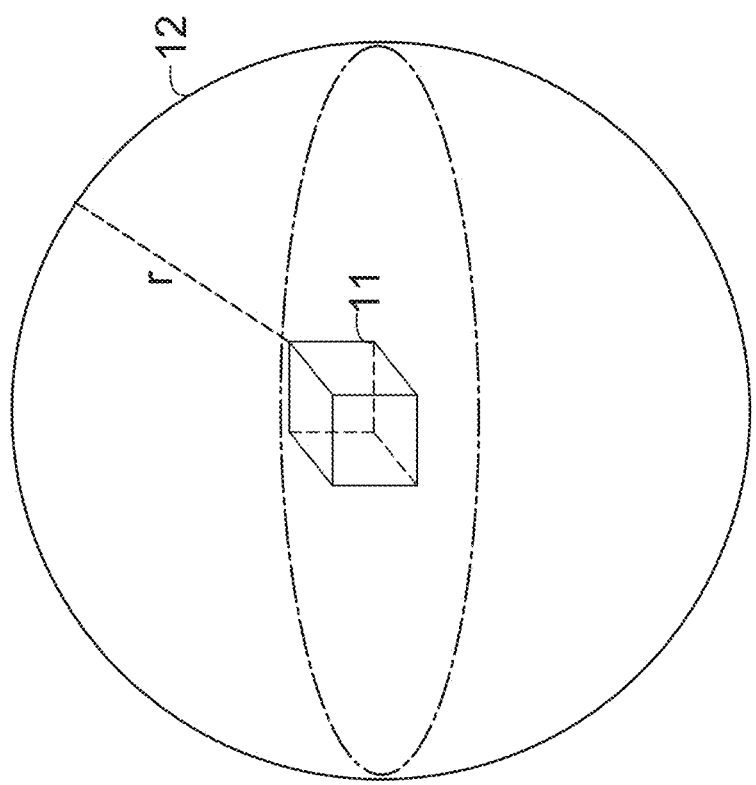
FIG. 1A shows a relation between a cube framework and a sphere.
Figure 1B:
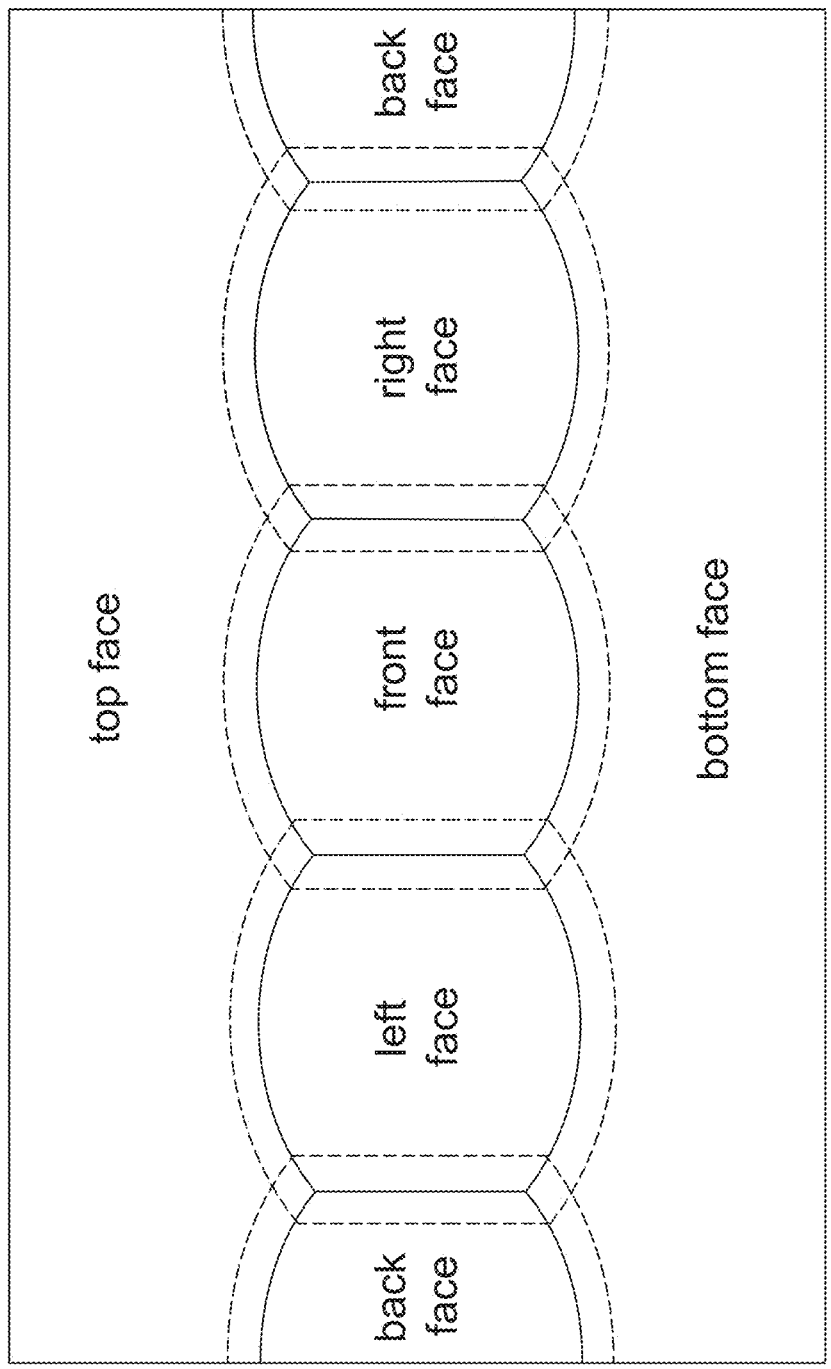
FIG. 1B shows an equirectangular panoramic image derived from an equirectangular projection of six-face lens images (top, bottom, right, left, front, back) from a six-lens 360-degree camera.
Figure 2B:
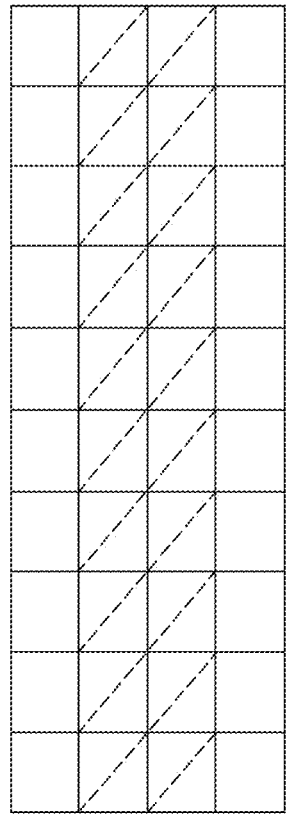
FIG. 2B shows a polygon mesh composing/modeling the equirectangular panoramic image.
Figure 2A:
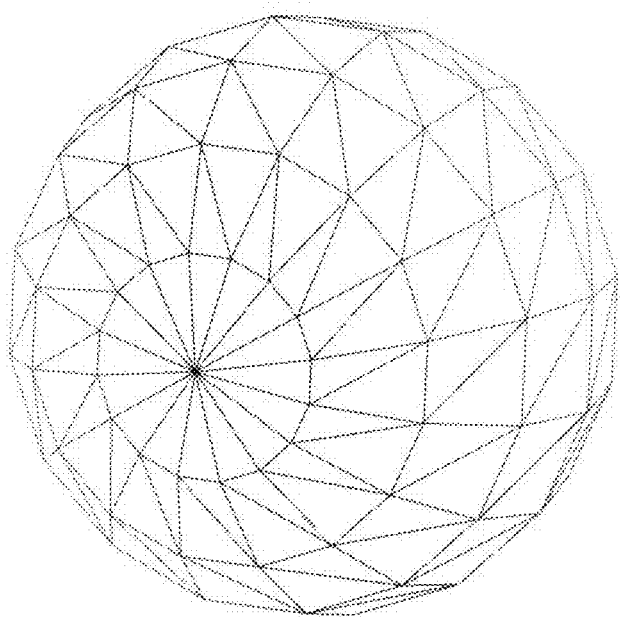
FIG. 2A shows a triangle mesh modeling a sphere surface.
Figure 3A:
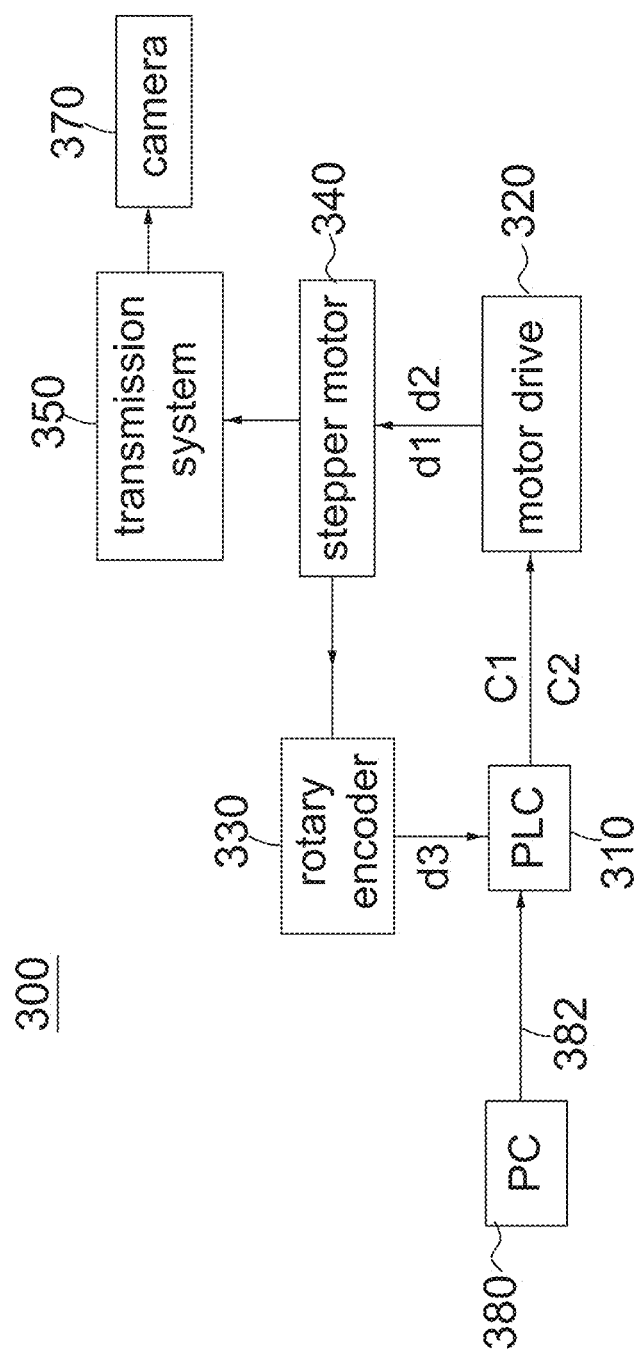
FIG. 3A shows a schematic diagram of a test equipment according to the invention.

FIG. 3A shows a schematic diagram of a test equipment according to the invention. Referring to FIG. 3A, a test equipment 300 of the invention includes a programmable logic controller (PLC) 310, a motor drive 320, a rotary encoder 330, a stepper motor 340, a transmission system 350, a 360-degree camera 370, a personal computer (PC) 380 and a housing 390 (see FIG. 3B). The PLC 310 is implemented with a processor consisting of a memory chip and integrated circuits (not shown). The PC 380 is used to activate the PLC 310 and upload data to the processor through a serial interface 382, such as RS-232 and USB. The memory chip stores a processor-executable program. When the processor-executable program is executed by the processor, the processor is configured to output a stepping control signal C1 and a direction control signal C2 for a predefined period of time (e.g., 5 seconds) according to a digital signal d3. According to the stepping control signal C1 and the direction control signal C2, the motor drive 320 outputs a stepping driving signal d1 and a direction driving signal d2 to drive the stepper motor 340. According to the stepping driving signal d1 and the direction driving signal d2, the stepper motor 340 causes the camera 370 to spin/rotate through the transmission system 350. The rotary encoder 330 converts the angular position or the motion of a shaft in the stepper motor 340 into the digital output signal d3.

FIG. 3B shows a profile view of the test equipment in FIG. 3A. The transmission system 350 includes two belt pulleys 351, 353, a belt 352, a shaft stand with a bearing 354, a transmission shaft 355 and a camera carrier 356. Referring to FIG. 3B, note that the PLC 310, the motor drive 320, the rotary encoder 330, a stepper motor 340 and the belt pulley 351 are arranged inside the housing 390, and the PC 380 (not shown), located outside the housing 390, is connected to the PLC 310 through the serial interface 382 (not shown). The belt pulley mechanism 351~353 utilizes the generated rotational motion to drive the transmission shaft 355 that causes the camera carrier 356 and the camera 370 to spin/rotate.

Figure 4A:
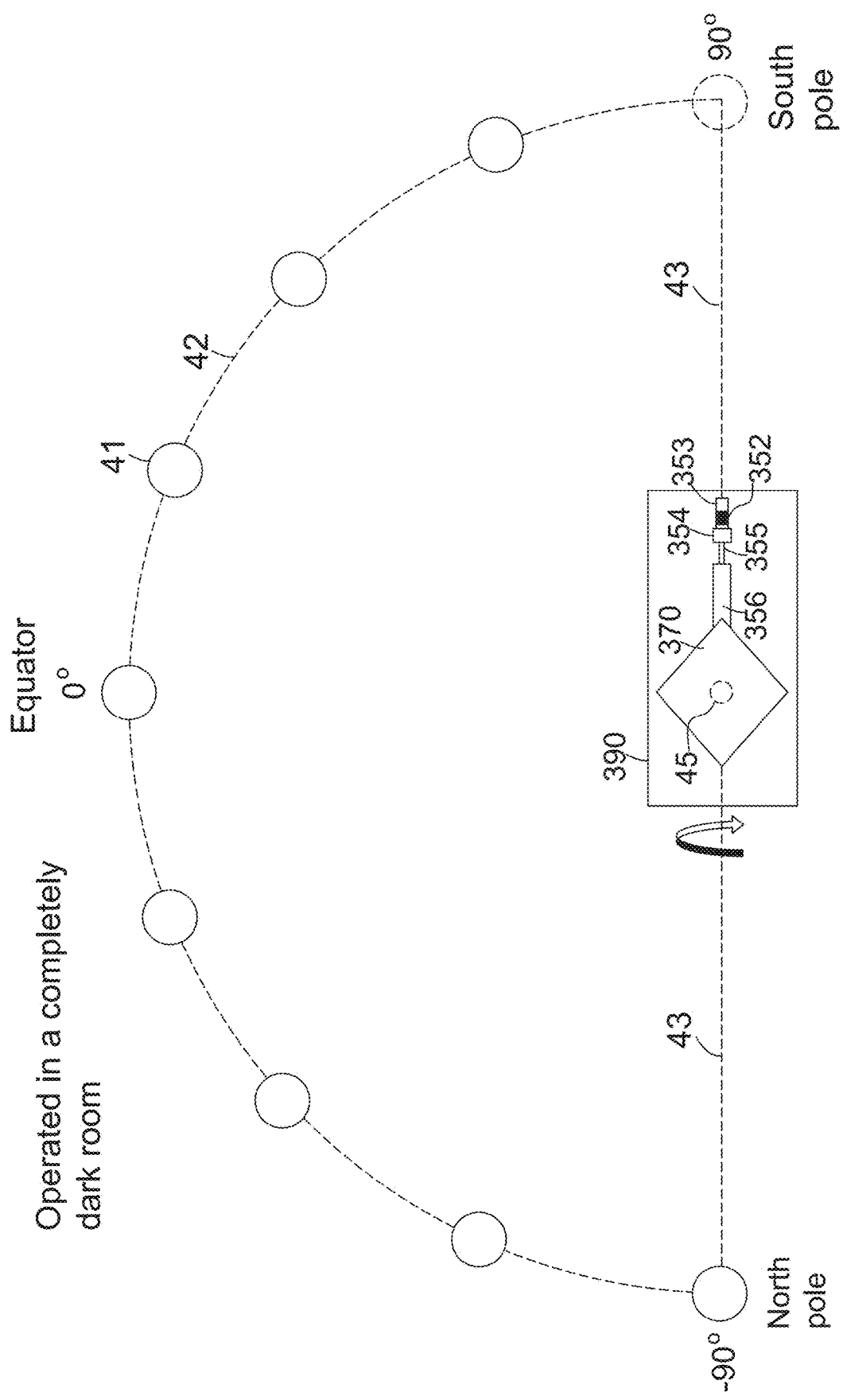
FIGS. 4A and 4B are a top view and a partial side view of the arrangement of the test equipment 300 and the lamps 41 for spherical coordinates calibration according to the invention.
Figure 4B:
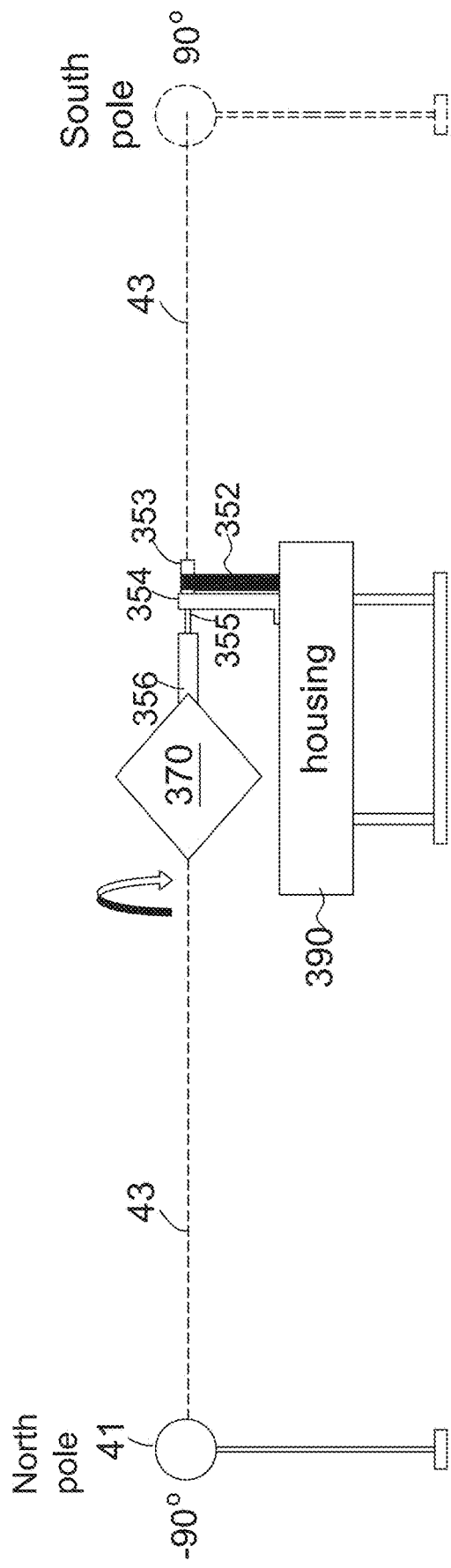

FIGS. 4A and 4B are a top view and a partial side view of the arrangement of the 360-degree camera 370 and the lamps 41 for spherical coordinates calibration according to the invention. The arrangement of the 360-degree camera 370 and the lamps 41 in FIGS. 4A and 4B is equivalent to a lying down virtual sphere with one meridian passing through the lamps 41 and forming a horizontal plane together with the 360-degree camera 370. The reason to lie the virtual sphere down is that it is easier to arrange the camera 370 and the lamps 41 with the same heights in comparison with a standing virtual sphere.

Figure 4C:
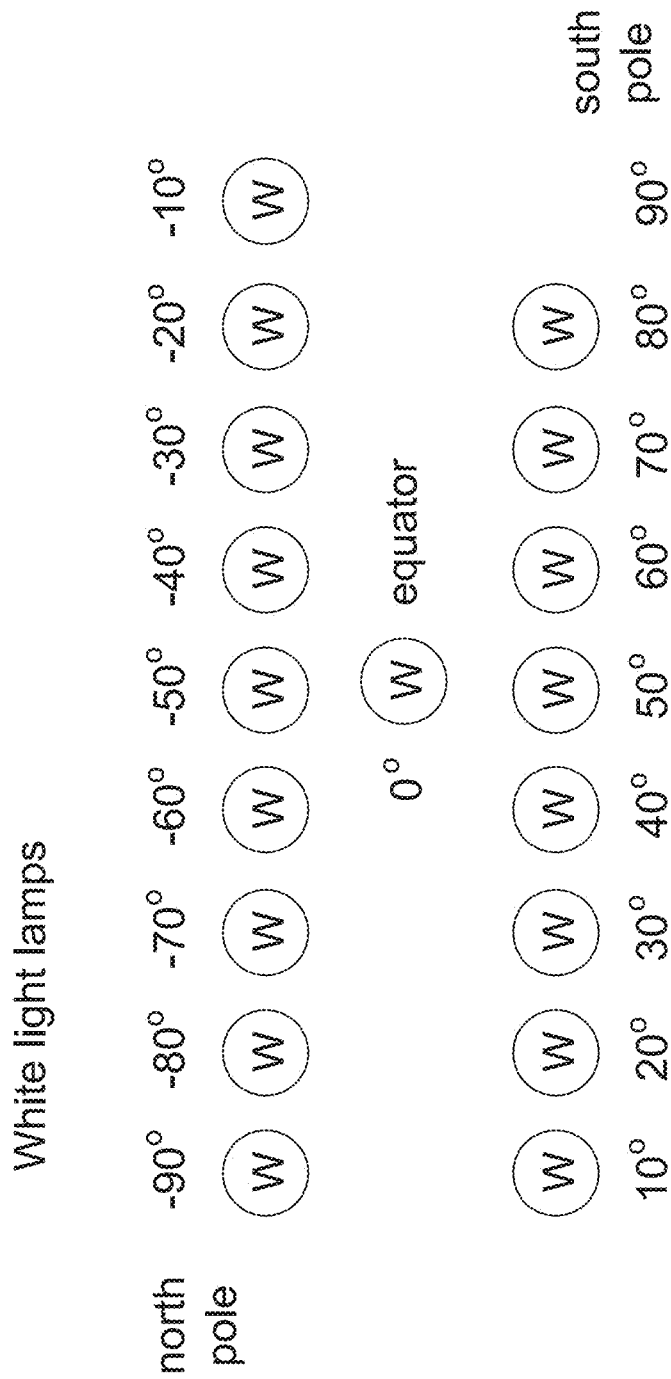
FIG. 4C is an example showing eighteen white-light lamps 41 form a horizontal semicircle arc 42 in shape.
Figure 4D:
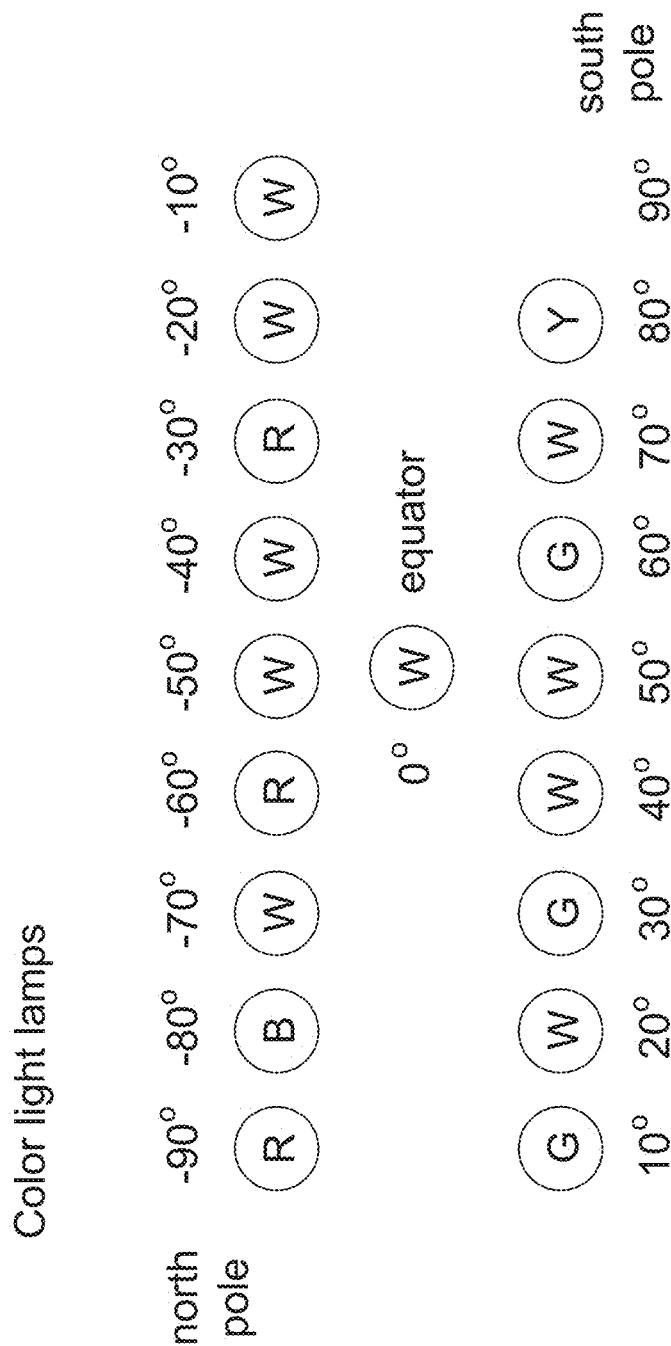
FIG. 4D is an example showing eighteen color-light lamps 41 form a horizontal semicircle arc 42 in shape.

Referring to FIGS. 4A and 4B, eight lamps 41 form a horizontal semicircle arc 42 in shape with the camera 370 located at the center 45 of a circle in a completely dark room. The horizontal semicircle arc 42 is a part of the circle. The 360-degree camera 370 has a plurality of lenses, each pointing at different directions, to simultaneously capture a 360-degree scene. The heights of the lamps 41 and the camera 370 are substantially the same. Ideally, the light beams from a 0-degree lamp 41 horizontally pass through one of the camera lens as well as the circle center 45; in addition, the light beams from a −90-degree lamp 41 horizontally pass through the axle center of the camera 370. A central angle has a vertex at the circle center 45 and the sides that pass through two adjacent lamps 41 on the semicircle arc 42. In the example of FIG. 4A, each central angle is 22.5 degrees and its radius is scalable. Example radiuses include, without limitation, 1 m, 3 m and 5 m. Please note that a 90-degree lamp at south pole is optional and can be eliminated to avoid being blocked by the transmission system 350. Thus, the 90-degree lamp at south pole is represented by a dotted circle. Please also note that the eight lamps 41 that form the horizontal semicircle arc 42 in FIG. 4A are provided by way of example, and not limitations of the invention. It should be understood that any other numbers of lamps can be used to form the horizontal semicircle arc 42 and their central angles may be different. In the examples of FIGS. 4C and 4D, a total of eighteen lamps 41 form a horizontal semicircle arc 42 in shape (not shown), i.e., its central angle equal to 10 degrees. A spin axis 43 is connected to two ends of the semicircle arc 42 to form a closed semicircle. For purposes of clarity and ease of description, hereinafter, the following examples and embodiments will be described with the assumption that the eighteen lamps 41 form the horizontal semicircle arc 42.

Figure 5A:
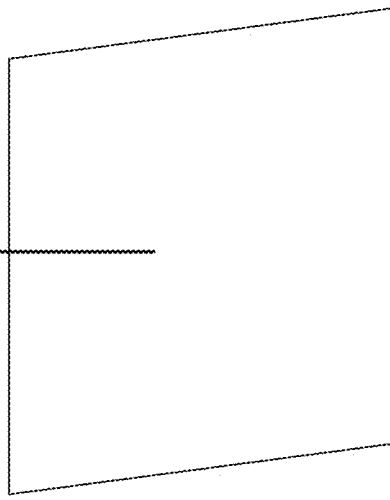
FIGS. 5A-5C are schematic diagrams of a two-lens, a three-lens and a six-lens 360-degree cameras.
Figure 5B:
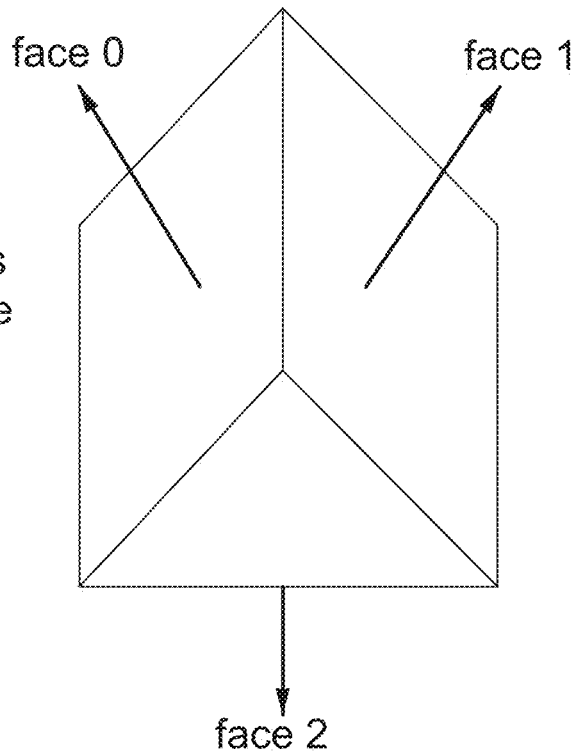
Figure 5C:
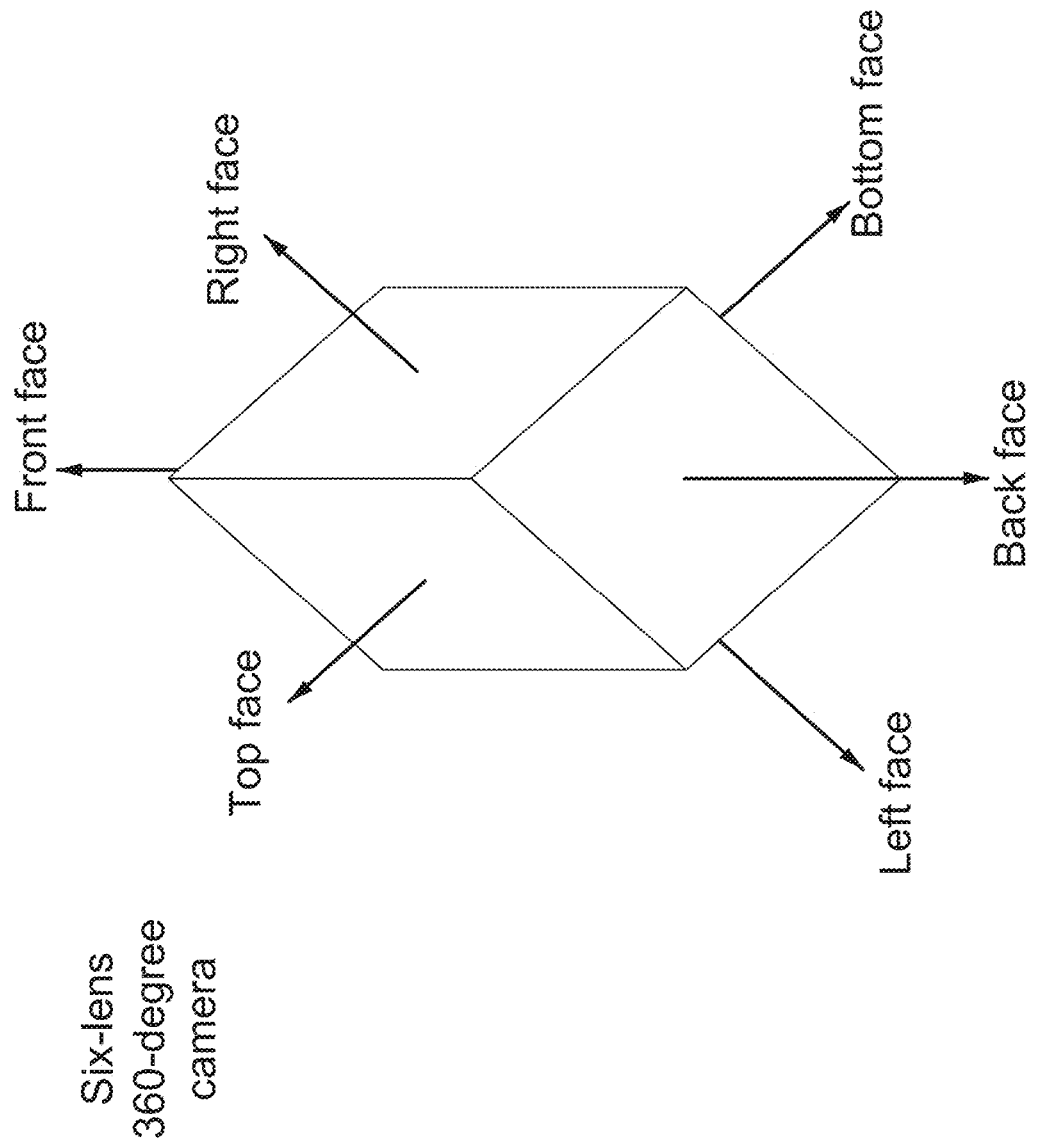
Figure 6A:
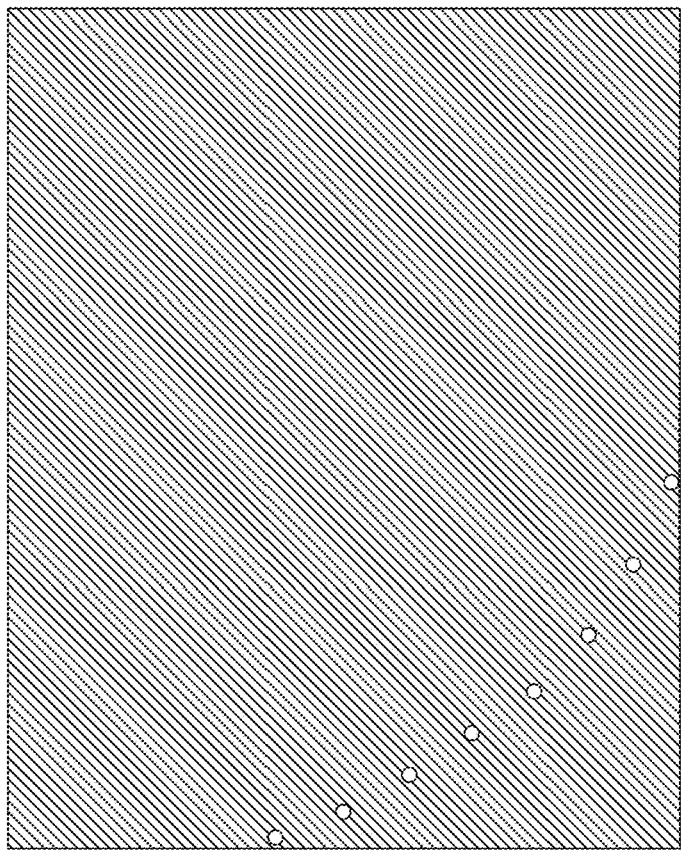
FIG. 6A shows schematic diagrams illustrating two lens images captured by lens "front face" of a six-lens 360-degree camera 370 at 0-degree longitude and 40-degree longitude, respectively.
Figure 6A:
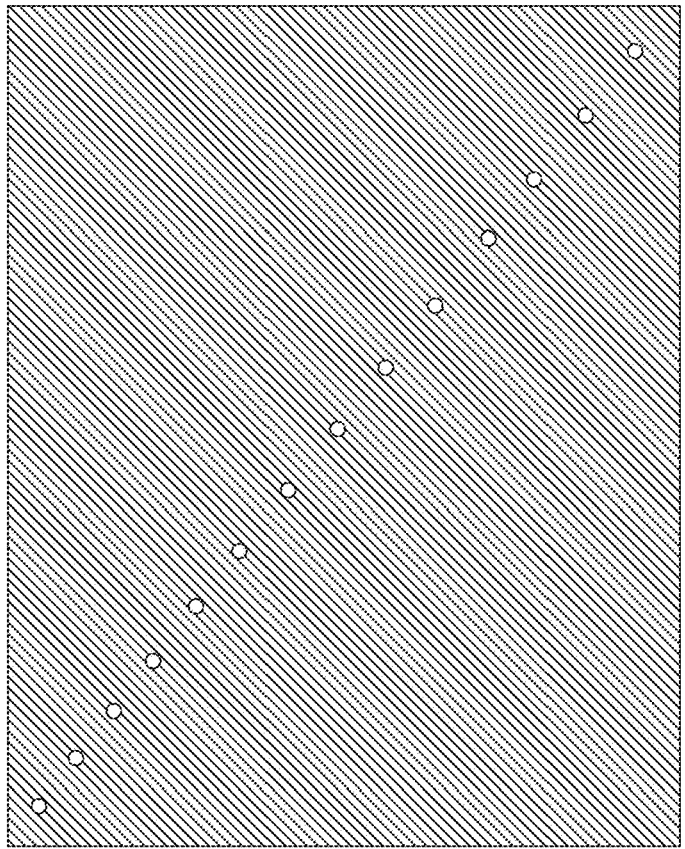
Figure 6B:
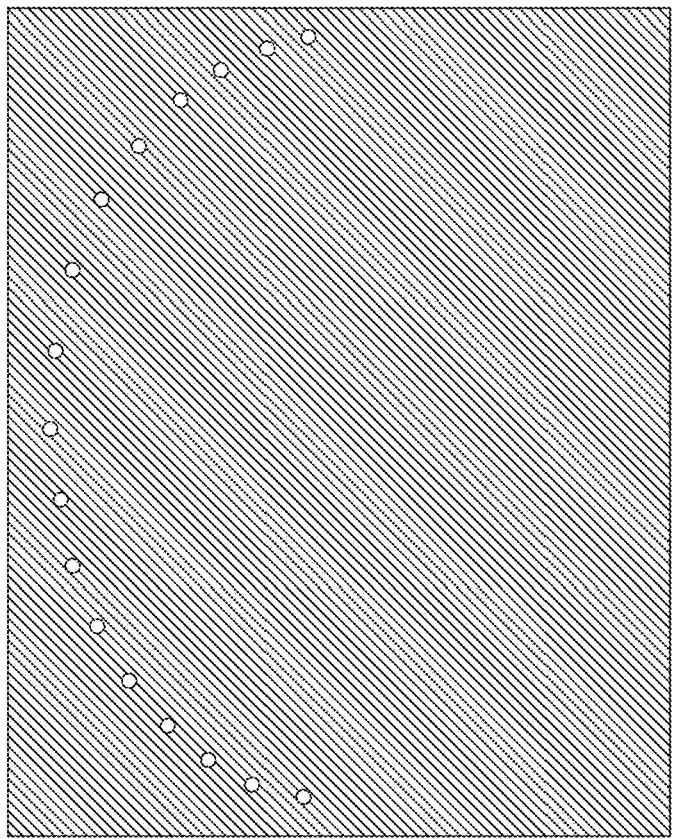
FIG. 6B shows schematic diagrams illustrating two lens images captured by lens "face 0" of a three-lens 360-degree camera 370 at 0-degree longitude and 40-degree longitude, respectively.
Figure 6B:
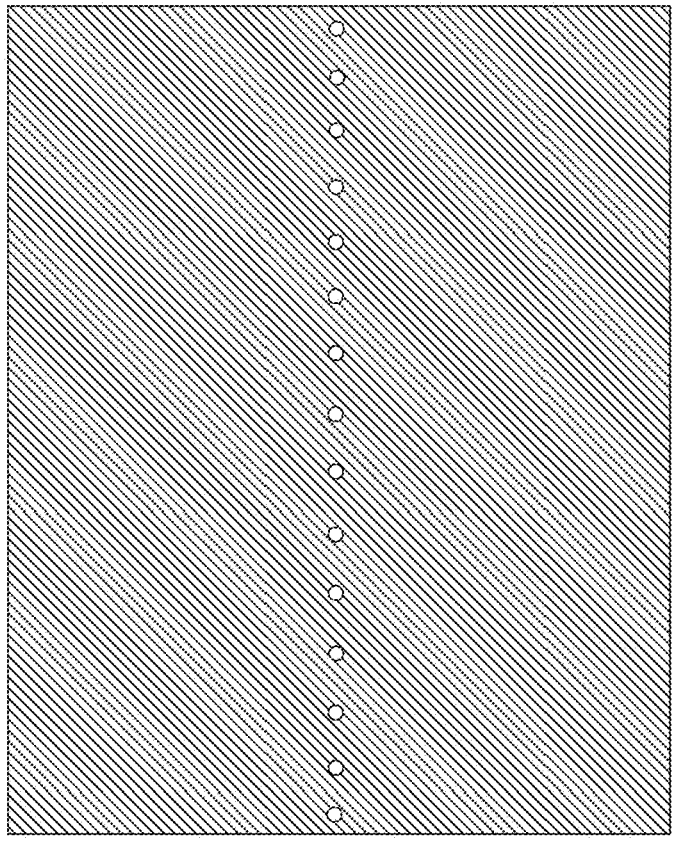

The 360-degree camera 370 is equipped with multiple lenses. FIGS. 5A-5C are schematic diagrams of a two-lens, a three-lens and a six-lens 360-degree cameras. Eighteen lamps 41 represent eighteen different latitudes of the virtual sphere. During an image capture phase, the lamps 41 are always turned on and the 360-degree camera 370 spins/rotates 360 degrees about the spin-axis 43 in a single direction (clockwise or counter-clockwise). The spin/rotation of the camera 370 about the spin-axis 43 is used to create different longitudes (or spin angles) of the virtual sphere. In an embodiment, the six-lens 360-degree camera 370 and the camera carrier 356 are locked to (on) the transmission shaft 355 such that the six-lens 360-degree camera 370 rotates as the transmission shaft 355 rotates; the six-lens 360-degree camera 370 captures six lens images whenever the transmission shaft 355 stops for every 10 degrees of rotation (i.e., stepping angle); accordingly, the camera 370 captures the lens images thirty-six times. Depending on different needs, the stepping angle is adjustable. FIG. 6A shows schematic diagrams illustrating two lens images captured by lens "front face" of a six-lens 360-degree camera 370 at 0-degree longitude and 40-degree longitude, respectively. FIG. 6B shows schematic diagrams illustrating two lens images captured by lens "face 0" of a three-lens 360-degree camera 370 at 0-degree longitude and 40-degree longitude, respectively. Please note that the lamps 41 shown in the lens images form a straight line or a curve. The numbers of the lamps 41 shown in the lens images are different depending on the FOV of the lenses in the camera 370, the number of the lenses in the camera 370, the spin angle and mounting angles by which their corresponding lenses of the camera 370 are mounted on the camera carrier 356. Please also note that for each stepping angle, there must be at least one lens image without showing any lamps, i.e., completely dark.

Figure 7:
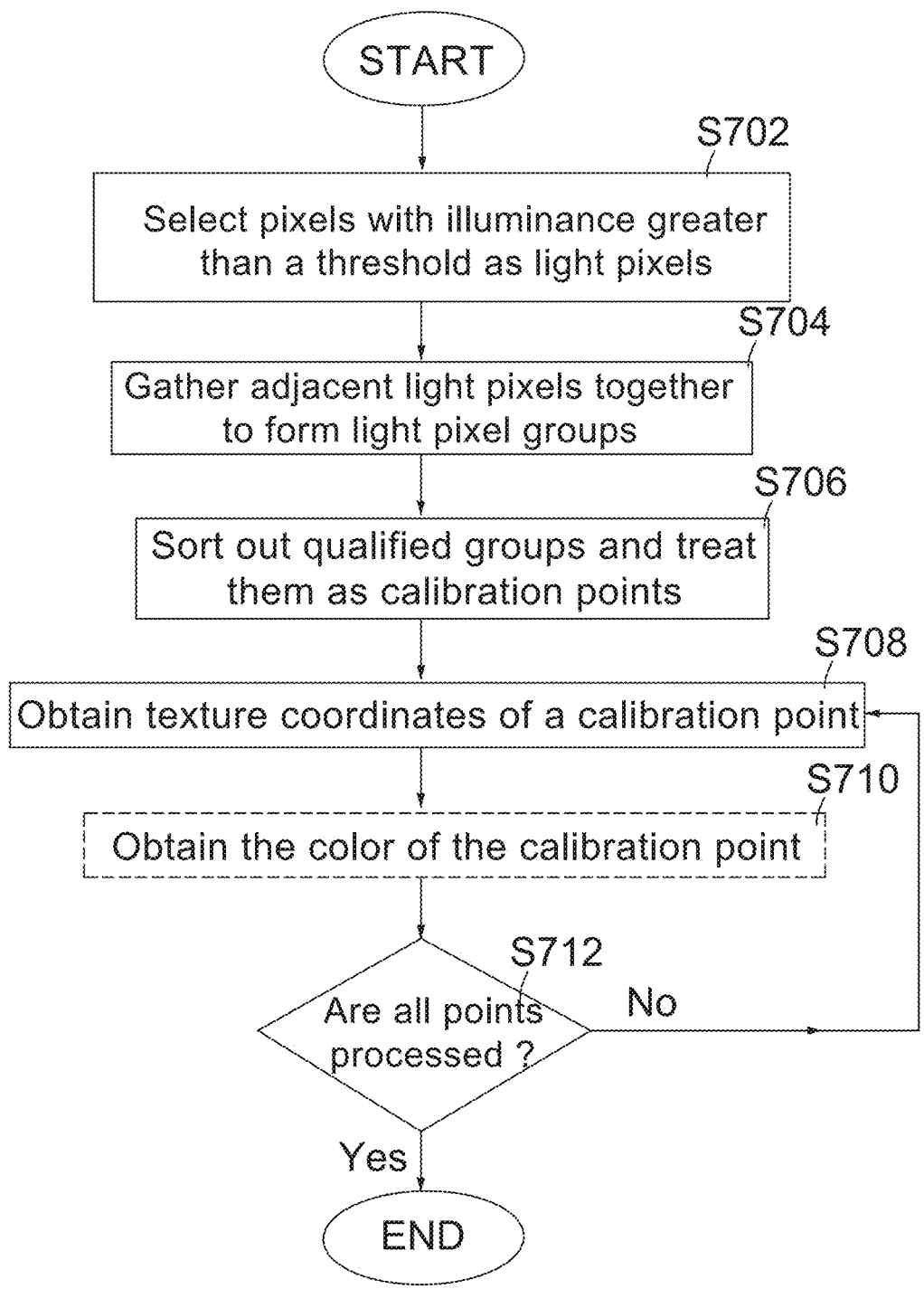
FIG. 7 is a flow chart showing a method of determining the texture coordinates and the color of calibration points in a lens image according to the invention.

FIG. 7 is a flow chart showing a method of determining the texture coordinates and the color of calibration points in a lens image according to the invention. Hereinafter, the method of determining the texture coordinates and the color of calibration points in a lens image is described with reference to FIGS. 6A-6B and 7.

Step S702: Select pixels with their illuminance values greater than a threshold from a lens image as light pixels in a lens image. In this specification, the term "light pixels" refers to pixels with their illuminance values greater than a threshold, such as 80. The illuminance value refers to Y component in YUV space or the strongest intensity among RGB components in RGB space.

Step S704: Gather a plurality of adjacent light pixels together to form a plurality of light pixel groups.

Step S706: Sort out the light pixel groups (i.e., qualified groups) with a predefined size and a predefined shape from the other light pixel groups and treat the qualified groups as light points or calibration points (corresponding to the lamps 41).

Step S708: Obtain the texture coordinates of a calibration point in the lens image by calculating the average texture coordinates of the light pixels in its corresponding qualified group.

Step S710: Obtain the color of the calibration point by calculating the average color of the light pixels in its corresponding qualified group. In the case of RGB space, the color of a calibration point is obtained by calculating the average intensities of R, G and B components of the light pixels in its qualified group. If correspondence tables are used for calibration (will be described below), it is no need to perform this step. Since this step is optional, it is represented in dotted lines in FIG. 7.

Step S712: Check whether all calibration points in this lens image are processed. If NOT, go to step S708 for the next calibration point; otherwise, the flow is terminated.

After the method of determining the texture coordinates and the color of calibration points in a lens image is performed, the texture coordinates of all the calibration points in the lens image are obtained. Besides, since a six-lens 360-degree camera 370 captures six lens images at a time and the six lens images corresponds to one individual spin angle, the longitudes of the calibration points in the six lens images are equal to its spin angle. The methods in FIGS. 8B-C and 9A are the solutions for the calibration points in each lens image to acquire their latitudes.

Figure 8A:
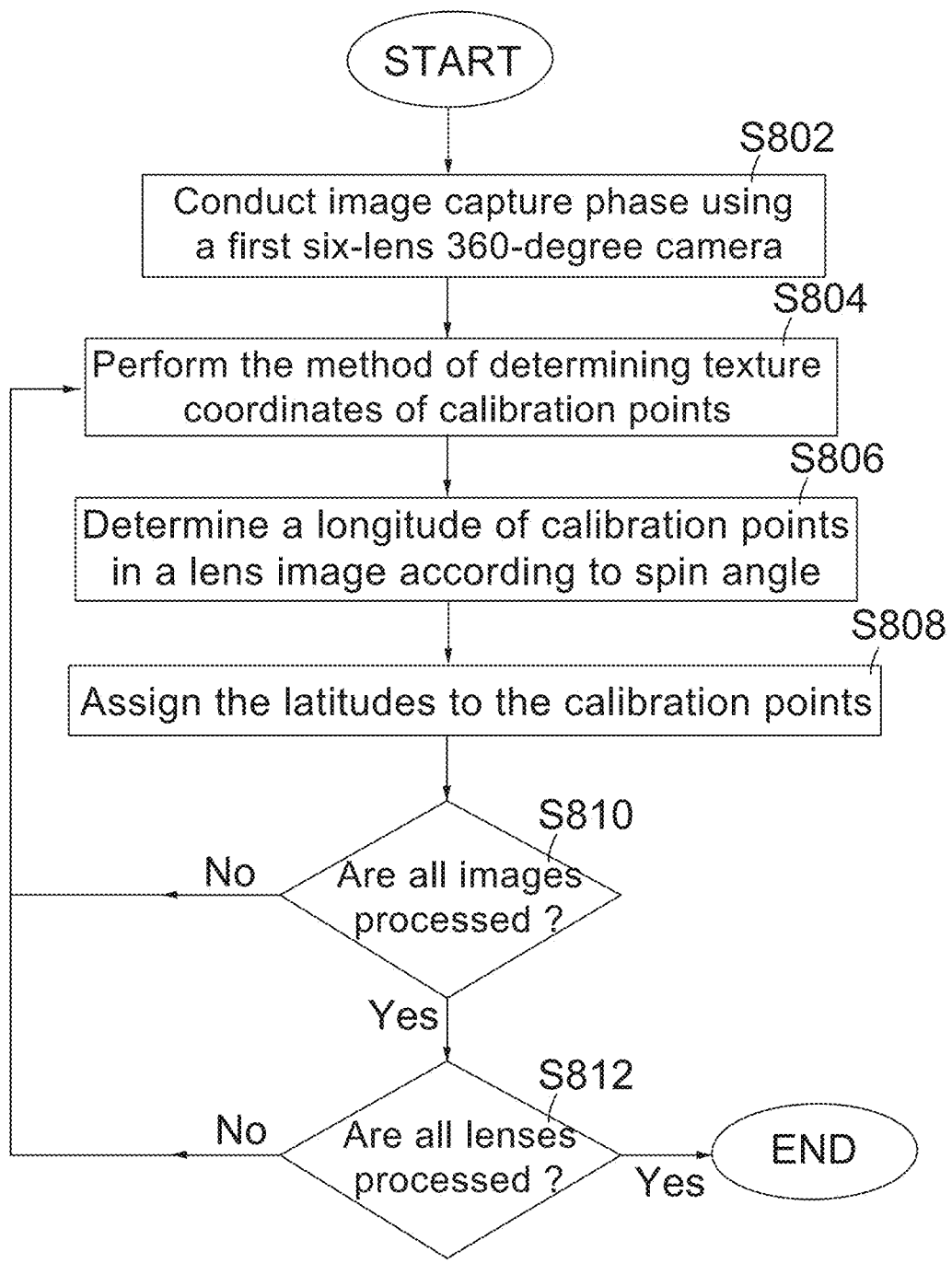
FIG. 8A is a flow chart showing a method for creating six correspondence tables using a first six-lens 360-degree camera according to an embodiment of the invention.
Figure 8B:
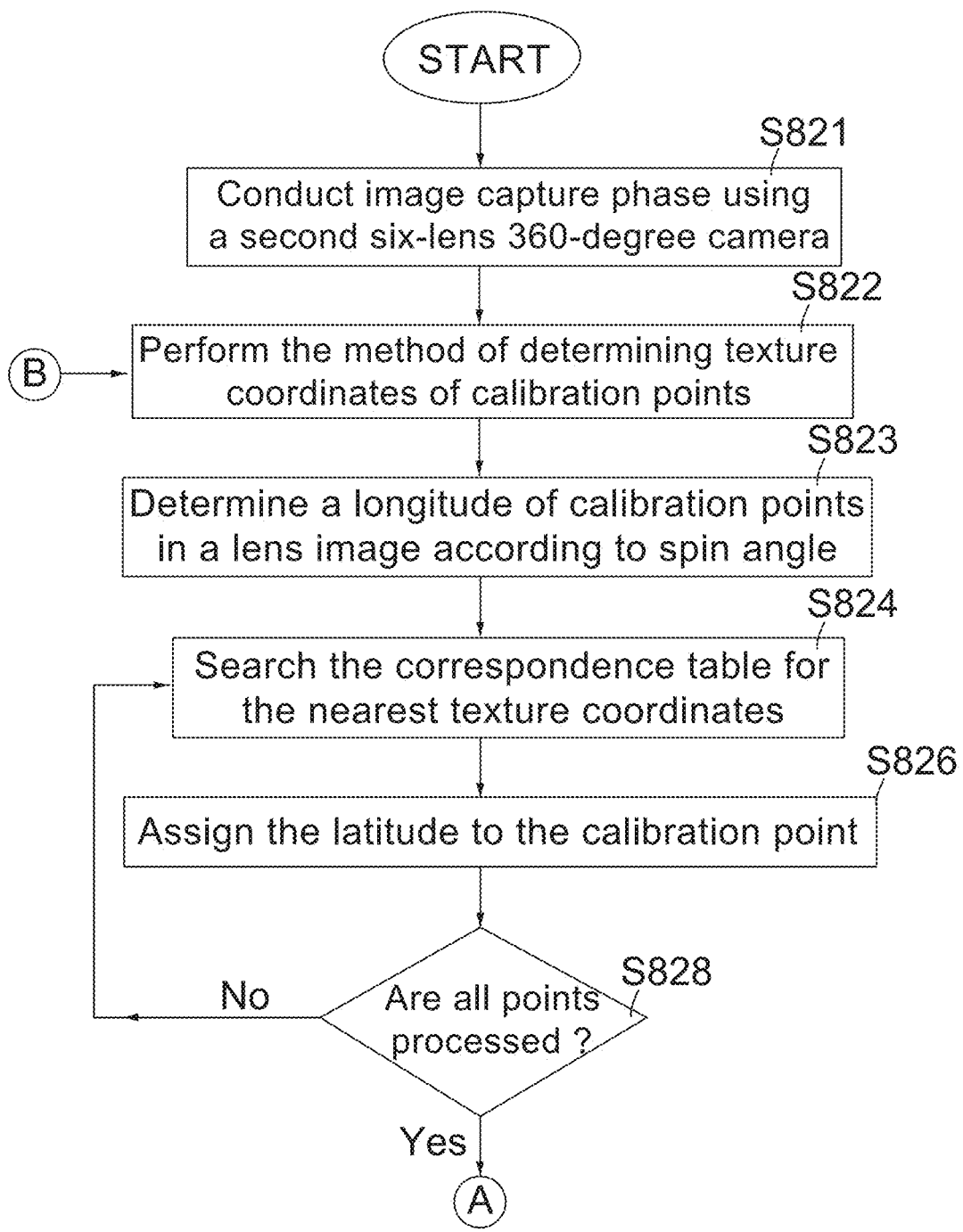
FIGS. 8B-8C show a flow chart showing a spherical coordinates calibration method using a second six-lens 360-degree camera according to an embodiment of the invention.
Figure 8C:
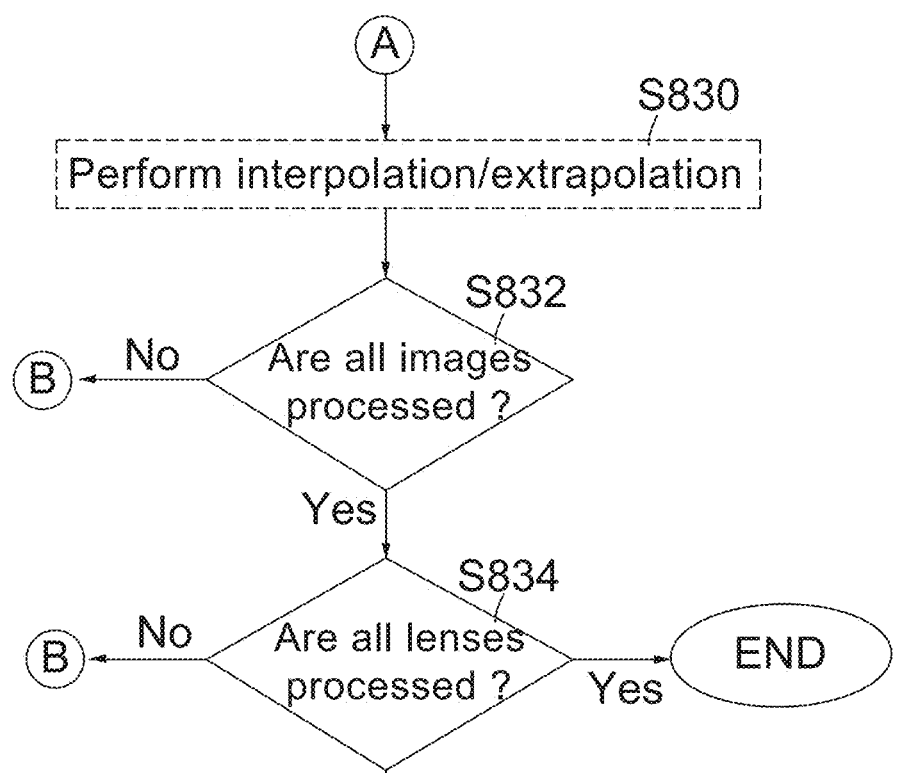
Figure 9A:
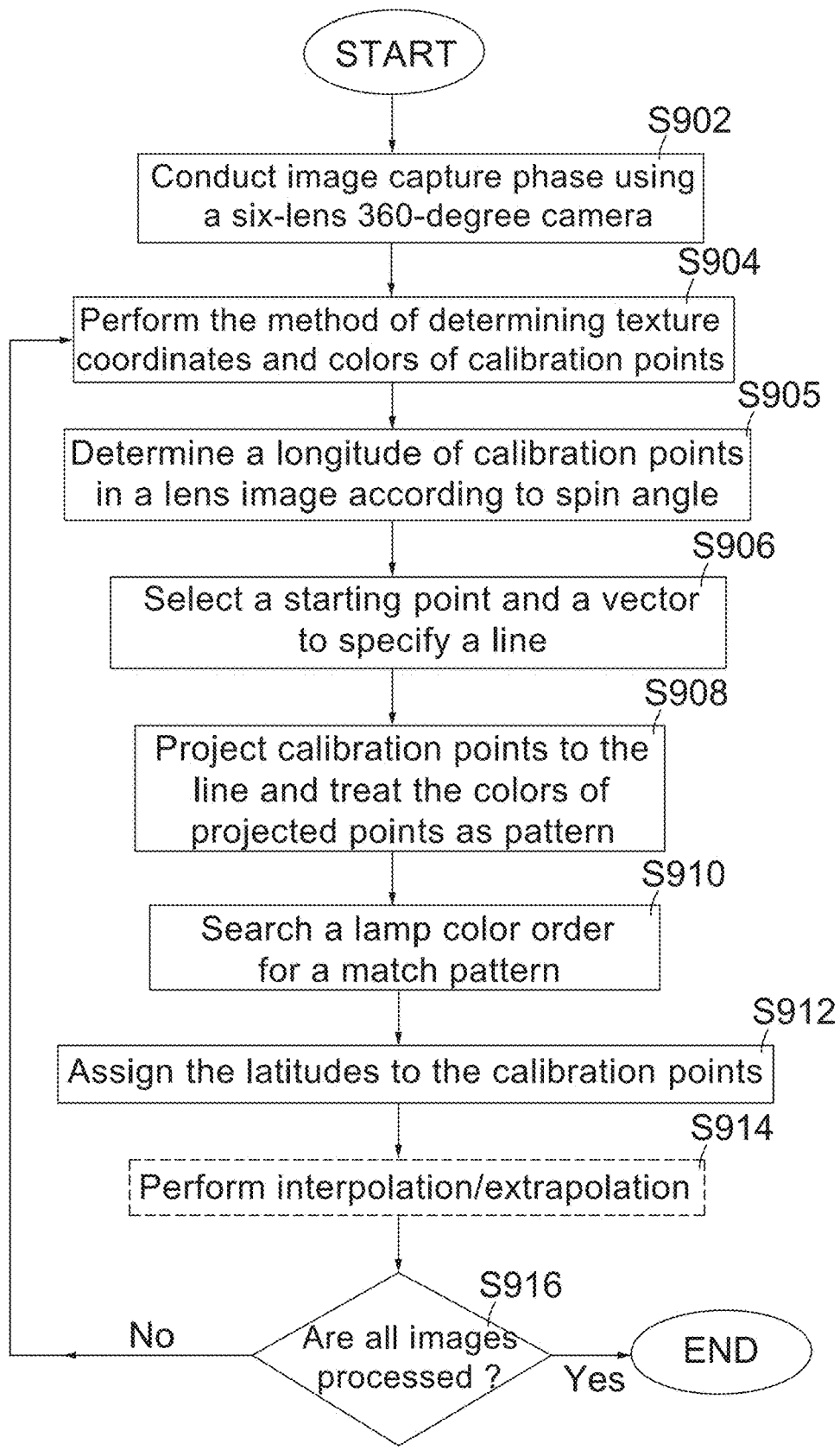
FIG. 9A is a flow chart showing a spherical coordinates calibration method using a six-lens 360-degree camera in conjunction with color-light lamps according to another embodiment of the invention.

The calibration method of the invention in FIGS. 8B-C is divided into an offline phase and an online phase. It is necessary to create a correspondence table in the offline phase. FIG. 8A is a flow chart showing a method for creating six correspondence tables using a first six-lens 360-degree camera according to an embodiment of the invention.

Step S802: Conduct an image capture phase using a first six-lens 360-degree camera so as to obtain a plurality of first lens images for each lens. Please note that the first six-lens 360-degree camera is mounted on the camera carrier prior to the image capture phase. In one embodiment, during the image capture phase, the lamps 41 are always turned on and the first six-lens 360-degree camera 370 spins 10 degrees (i.e., stepping angle θ1) about the spin-axis 43 in a single direction (e.g., clockwise) and stops to capture six first lens images at a time. Accordingly, the first six-lens 360-degree camera 370 captures the first lens images thirty-six times to generate 36×6 first lens images in total.

Step S804: Perform the method of determining the texture coordinates of calibration points in a first lens image in FIG. 7 to obtain the texture coordinates of calibration points in the first lens image.

Step S806: Determine a longitude of the calibration points in the first lens image captured by a current lens (top, bottom, right, left, front, back) of the first six-lens 360-degree camera 370 according to its spin angle. The first lens image is related to a spin angle and the longitude of the calibration points in the first lens image is equal to its spin angle.

Step S808: Respectively assign the latitudes to the calibration points in the first lens image according to the positions of the lamps 41 by any known means. For example, a person identifies the latitudes according to the positions of the lamps 41 in the semicircle arc 42 and respectively assigns the latitudes to the calibration points in the first lens image by hand (i.e., by doing a manual identification).

Step S810: Check whether all the first lens images for the current lens are processed. If NOT, go to step S804 for the next first lens image; otherwise, go to step S812 and it indicates a correspondence table for the current lens is obtained.

Step S812: Check whether all the lenses are processed. If NOT, go to step S804 for the next lens; otherwise, the flow is terminated and it indicates six correspondence tables for the six lenses are obtained.

The correspondence table is used to construct a real point mapping between the longitude and latitude coordinates and the texture coordinates for the calibration points in each of the thirty-six lens image for each of the six lenses. The correspondence table is a list of a plurality of point correspondences for one of the six lenses. In other words, because the 360-degree camera 370 has six lenses, there are six correspondence tables in total. Table 1 shows an exemplary correspondence table for lens "front face" in the six-lens 360-degree camera 370.

TABLE 1

| longitude | latitude | u | v |
|---|---|---|---|
| 0 | 70 | 117 | 61 |
| 0 | 60 | 193 | 139 |
| 0 | 50 | 282 | 226 |
| 0 | 40 | 379 | 324 |
| 0 | 30 | 480 | 423 |
| 0 | 20 | 579 | 525 |
| 0 | 10 | 679 | 624 |
| 0 | 0 | 778 | 729 |
| 0 | −10 | 898 | 847 |
| 0 | −20 | 1000 | 949 |
| 0 | −30 | 1096 | 1048 |
| 0 | −40 | 1191 | 1146 |
| 0 | −50 | 1287 | 1240 |
| 0 | −60 | 1374 | 1329 |
| 0 | −70 | 1450 | 1408 |
| ... | | | |
| 10 | 70 | 70 | 108 |
| 10 | 60 | 133 | 202 |
| 10 | 50 | 207 | 303 |
| 10 | 40 | 292 | 411 |
| 10 | 30 | 381 | 519 |
| 10 | 20 | 480 | 628 |
| 10 | 10 | 574 | 732 |
| 10 | 0 | 675 | 835 |
| 10 | −10 | 798 | 954 |
| 10 | −20 | 901 | 1050 |
| 10 | −30 | 1006 | 1141 |
| 10 | −40 | 1107 | 1231 |
| 10 | −50 | 1219 | 1315 |
| 10 | −60 | 1318 | 1387 |
| 20 | 70 | 22 | 151 |
| 340 | −90 | 769 | 1371 |
| 340 | −80 | 908 | 1382 |
| 340 | −70 | 1054 | 1402 |
| 340 | −60 | 1204 | 1409 |
| 340 | −50 | 1351 | 1399 |
| 340 | −40 | 1494 | 1367 |
| 350 | −80 | 913 | 1362 |
| 350 | −70 | 1061 | 1360 |
| 350 | −60 | 1216 | 1344 |
| 350 | −50 | 1364 | 1312 |
| 350 | −40 | 1507 | 1261 |

In Table 1, u and v denote texture coordinates of a calibration point in its lens image, i.e., relative to the location (0, 0) in the texture (lens image). Please note that since the stepping angle is 10 degrees, there are thirty-six slice correspondences ranging from 0-degree to 350-degree longitudes in Table 1 for lens "front face". Due to the fact that its data volume is huge, however, Table 1 shows only four slice correspondences (i.e., 0-degree, 10-degree, 340-degree and 350-degree longitudes) and the other slice correspondences are skipped for the sake of brevity. Each slice correspondence corresponding to one individual longitude includes a plurality of point correspondences. Each point correspondence defines the longitude and latitude coordinates and the texture coordinates for a corresponding calibration point. For example, the first point correspondence in the first slice correspondence in Table 1 defines a real point mapping between the longitude and latitude coordinates (0, 70) and the texture coordinates (117, 61) for the first calibration point in the "front-face" lens image. There are seventeen point correspondences in the slice correspondence for 0-degree longitude and six point correspondences in the slice correspondence for 340-degree longitude.

In the online phase, minimal work is conducted to obtain the latitude coordinates for the calibration points. FIGS. 8B-C show a flow chart showing a spherical coordinates calibration method using a second six-lens 360-degree camera according to an embodiment of the invention. The calibration method is used to link spherical coordinates to texture coordinates. Hereinafter, the calibration method is described with reference to FIGS. 8B-C and with the assumption that the stepping angle is 10 degrees.

Step S821: Conduct an image capture phase using a second six-lens 360-degree camera so as to obtain a plurality of second lens images for each lens. Please also note that the second six-lens 360-degree camera, different from the first six-lens 360-degree camera used in FIG. 8A, is mounted on the camera carrier 356 prior to the image capture phase. In one embodiment, during the image capture phase, the lamps 41 are always turned on and the second six-lens 360-degree camera 370 stops to capture six lens images by the six lenses whenever the camera 370 spins 10 degrees (i.e., stepping angle θ2) about the spin-axis 43 in a single direction (e.g., clockwise). Accordingly, the second six-lens 360-degree camera 370 captures the second lens images thirty-six times to generate 36×6 second lens images in total. Please note that θ2 is either equal to θ1 or a multiple of θ1 (used in the method for creating the six correspondence tables in FIG. 8A).

Step S822: Perform the method of determining the texture coordinates of calibration points in a second lens image in FIG. 7 to obtain the texture coordinates of calibration points in the second lens image.

Step S823: Determine a longitude of the calibration points in the second lens image captured by a current lens (top, bottom, right, left, front, back) of the second six-lens 360-degree camera 370 according to its spin angle. The second lens image is related to a spin angle and the longitude of the calibration points in the second lens image is equal to its spin angle.

Step S824: According to the longitude and the texture coordinates of a calibration point in the second lens image captured by the current lens of the second six-lens 360-degree camera 370, search the correspondence table associated with the current lens for the nearest texture coordinates to obtain a latitude of a best-match point correspondence. For example, with the assumption that a calibration point P0 in a "front-face" second lens image has a 0-degree longitude and texture coordinates (120, 60), after the slice correspondence for 0-degree longitude in the correspondence table (Table 1) associated with lens "front face" is searched for the nearest texture coordinates, it is determined that the first point correspondence with texture coordinates (117, 61) in the correspondence table (Table 1) is the "best match".

Step S826: Assign the latitude of the best-match point correspondence to the calibration point. Regarding the example given in step S824, due to the best-match point correspondence with texture coordinates (117, 61), the 0-degree longitude and a 70-degree latitude in Table 1, its 70-degree latitude is assigned to the calibration point P0 in the "front-face" second lens image.

Step S828: Check whether all calibration points in this second lens image are processed. If NOT, go to step S824; otherwise, go to step S830.

Step S830: Perform interpolation and/or extrapolation over the the longitude and latitude coordinates and the texture coordinates of the existing calibration points to obtain the longitude and latitude coordinates and the texture coordinates of additional calibration points for this second lens image. This step is optional. Since this step is optional, it is represented in dotted lines in FIG. 8C.

Step S832: Check whether all the second lens images for the current lens are processed. If NOT, go to step S822 for the next second lens image; otherwise, go to step S834.

Step S834: Check whether all the lenses are processed. If NOT, go to step S822 for the next lens; otherwise, the flow is terminated.

FIG. 9A is a flow chart showing a spherical coordinates calibration method using a six-lens 360-degree camera in conjunction with color-light lamps according to another embodiment of the invention. The calibration method is used to link spherical coordinates to texture coordinates. Hereinafter, the calibration method is described with reference to FIG. 9A and with the assumption that the stepping angle is 10 degrees and the lamps 41 respectively emit different colors of light.

Step S902: Conduct an image capture phase using a six-lens 360-degree camera 370 so as to obtain a plurality of lens images for each lens. In one embodiment, during the image capture phase, the lamps 41 are always turned on and the camera 370 stops to capture six lens images by the six lenses whenever the camera 370 spins 10 degrees (i.e., stepping angle) about the spin-axis 43 in a single direction (e.g., clockwise). Accordingly, the six-lens 360-degree camera 370 captures the lens images thirty-six times to generate 36×6 lens images in total.

Step S904: Perform the method of determining the texture coordinates and the colors of calibration points in a lens image in FIG. 7. At the end of this step, the texture coordinates (u, v) and the colors of calibration points in the lens image are obtained.

Step S905: Determine a longitude of the calibration points in the lens image according to its spin angle. The lens image is related to a spin angle and the longitude of the calibration points in the lens image is equal to the spin angle.

Figure 9B:
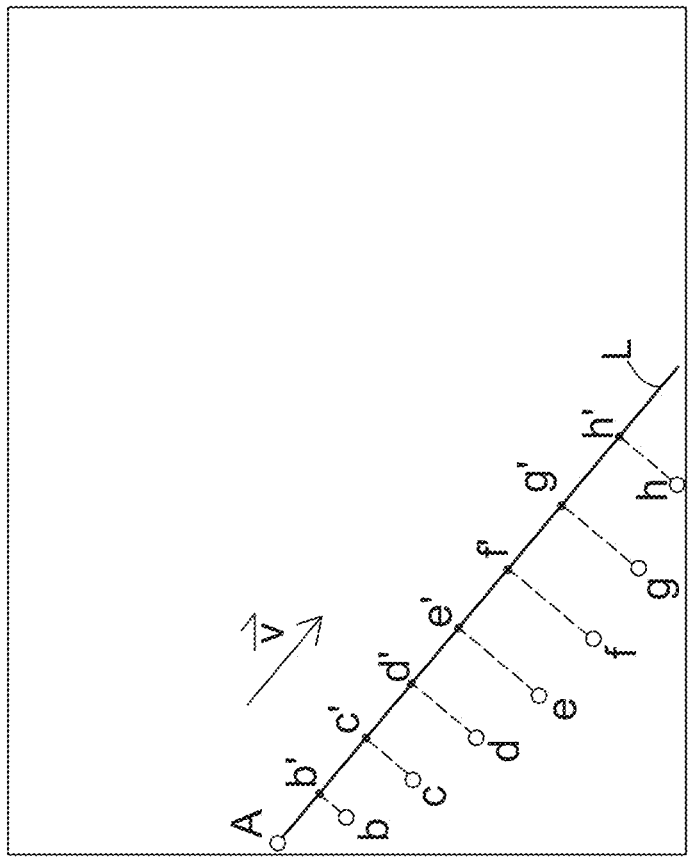
FIG. 9B is exemplary diagram showing how to select a starting point and a vector to specify a straight line based on the diagram (front face, 40-degree longitude) on the right side of FIG. 6A.

Step S906: Select a starting point and a vector to specify a straight line for the lens image. Take the diagram (front face, 40-degree longitude) on the right side of FIG. 6A for example. As shown in FIG. 9B, firstly, select the left-most calibration point A as a starting point and the starting point A on a straight line L has a vector $\vec{a}$; then, select a vector $\vec{v}$, parallel to the line L. Thus, a vector equation of the straight line L is $\vec{r} = \vec{a} + \lambda \vec{v}$, where $\vec{r}$ denotes any point on the straight line and X is any number. Please note that selecting the point A as a starting point is provided by way of example and not limitations of the invention. Theoretically, any point in the lens image can be selected as a starting point. However, a point adjacent to one of two ends of the calibration point line/curve is preferably selected as the starting point.

Step S908: Project calibration points to the straight line L and treat the colors of projected points on the straight line L as a color pattern. In the case of FIG. 9B, project calibration points (b~h) to the straight line L to find the projected points (b'~h') on the straight line L and it is assumed that the colors of projected points (from point b' to point h') are in the order of WRWWWGW, where W denotes white light, R denotes red light and G denotes green light. "WRWWWGW" is treated as the color pattern.

Step S910: Search a lamp color order for a match color pattern. As the example of FIG. 4D, there are eighteen lamps and the colors of eighteen lamps in order (i.e., the lamp color order) from −90° to +90° (or in ascending order of latitude) are "RBWRWWRWWWGWGWWGWY", where B denotes blue light and Y denotes yellow light. It is easy to find the match color pattern (WRWWWGW) in the lamp color order, and thus the match color pattern with latitudes ranging from −40 degrees to 20 degrees are obtained. In a case that there is no match, the lamp color order would be searched in descending order of latitude to find whether there is a match color pattern.

Step S912: Assign the latitudes of the match color pattern to the calibration points in the lens image. Regarding the example given in step S910, the latitudes ranging from −40 degrees to 20 degrees are assigned to the calibration points (b-h) in this lens image.

Step S914: Perform interpolation and/or extrapolation over the longitude and latitude coordinates and the texture coordinates of the existing calibration points to obtain the longitude and latitude coordinates and the texture coordinates of additional calibration points for this lens image. This step is optional. Since this step is optional, it is represented in dotted lines in FIG. 9A.

Step S916: Check whether all the lens images are processed. If NOT, go to step S904 for the next lens image; otherwise, the flow is terminated.

The test equipment 300 is provided by way of example and not limitations of the invention. In the actual implementation, any other mechanisms or equipment (capable of causing the 360-degree camera 370 to spin about the spin axis 43 passing through two ends of the horizontal semi-circle arc 42) can be used and this also falls in the scope of the invention. Although the above embodiments and examples are described in terms of a 360-degree camera, it should be understood that the embodiments of the invention are not so limited, but are generally applicable to wide-angle cameras, panoramic cameras and the like.

The above embodiments and functional operations described in FIGS. 7, 8A-8C and 9A can be implemented in digital electronic circuitry, in tangibly-embodied computer software or firmware, in computer hardware, including the structures disclosed in this specification and their structural equivalents, or in combinations of one or more of them. The methods and logic flows described in FIGS. 7, 8A-8C and 9A can be performed by one or more programmable computers executing one or more computer programs to perform their functions. The methods and logic flows in FIGS. 7, 8A-8C and 9A can also be performed by special-purpose logic circuitry, e.g., an FPGA (field programmable gate array) or an ASIC (application-specific integrated circuit). Computers suitable for the execution of the one or more computer programs include, but are not limited to, general-purpose microprocessors, special-purpose microprocessors, and/or any other kind of central processing unit. Computerreadable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A calibration method for linking spherical coordinates to texture coordinates, comprising:
   installing a plurality of lamps forming a horizontal semicircle arc and a rotation equipment located at its circle center;
   mounting a first N-lens camera on the rotation equipment, wherein N>1;
   causing the first N-lens camera to spin about a spin axis passing through two ends of the horizontal semicircle arc and capture a plurality of first lens images for different first spin angles by the rotation equipment; and
   determining longitude and latitude coordinates of a plurality of first calibration points according to the different first spin angles and the texture coordinates of the first calibration points in the first lens images to create a link between the spherical coordinates and the texture coordinates;
   wherein the first calibration points in each first lens image are associated with the lamps shown in each first lens image;
   wherein heights of the first N-lens camera and the lamps are the same; and
   wherein different positions of the lamps respectively represent different latitudes and different first spin angles respectively represent different longitudes.

2. The calibration method according to claim 1, wherein the step of causing comprises:
   turning on the lamps;
   causing the first N-lens camera to generate N first lens images for a current first spin angle whenever the first N-lens camera spins a first stepping angle about the spin axis in a single direction, wherein N>1; and
   repeating the step of causing the first N-lens camera to generate the N first lens images until the current first spin angle is equal to or greater than 360 degrees to obtain the plurality of first lens images for different first spin angles;
   wherein the current first spin angle is the sum of the first stepping angles.

3. The calibration method according to claim 1, wherein the step of installing further comprises:
   installing the lamps forming the horizontal semicircle arc and the rotation equipment located at its circle center in a dark room.

4. The calibration method according to claim 1, wherein the step of determining the longitude and latitude coordinates comprises:
   determining the texture coordinates, colors and a longitude of the first calibration points in a current first lens image associated with a corresponding first spin angle;
   projecting the first calibration points to a straight line in the current first lens image to obtain a color pattern;
   searching a lamp color order for the color pattern to obtain latitudes of the first calibration points in the current first lens image; and
   repeating the steps of determining the texture coordinates, projecting and searching until all the first lens images are processed to create the link between the spherical coordinates and the texture coordinates, wherein the lamps respectively emit different colors of light.

5. The calibration method according to claim 4, further comprising:
   performing at least one of interpolation and extrapolation over the longitude, the latitude and the texture coordinates of the existing first calibration points to obtain the longitude, the latitude and the texture coordinates of additional first calibration points for the current first lens image prior to the step of repeating and after the step of searching.

6. The calibration method according to claim 4, whether the step of determining the texture coordinates, the colors and the longitude comprises:
   selecting pixels with illumination values greater than a threshold as light pixels in the current first lens image;
   gathering adjacent light pixels together to form light pixel groups;
   separating qualified groups with a predefined size and a predefined shape from the other light pixel groups to define the qualified groups as the first calibration points;
   respectively obtaining the texture coordinates and the color of a current first calibration point in the current first lens image by calculating the average texture coordinates and the average color of the light pixels in a corresponding qualified group;
   repeating the step of respectively obtaining the texture coordinates and the color of the current first calibration point until all the first calibration points in the current first lens image are processed; and
   assigning a longitude to all the first calibration points in the current first lens image according to its corresponding first spin angle.

7. The calibration method according to claim 4, wherein the step of projecting comprises:
   selecting a starting point and a vector to specify the straight line in the current first lens image;
   projecting all the first calibration points to the straight line in order to obtain a plurality of projected points on the straight line; and
   obtaining the color pattern according to the colors of projected points in a given order.

8. The calibration method according to claim 4, wherein the step of searching comprises:
   searching the lamp color order in descending order of latitude for the color pattern to obtain latitudes of the first calibration points in the current first lens image.

9. The calibration method according to claim 4, wherein the step of searching comprises:
   searching the lamp color order in ascending order of latitude for the color pattern to obtain latitudes of the first calibration points in the current first lens image.

10. The calibration method according to claim 1, wherein the step of determining the longitude and latitude coordinates comprises:
    (a) determining the texture coordinates and a longitude of the first calibration points in a current first lens image associated with a corresponding first spin angle;

(b) searching a corresponding one of N correspondence tables for the nearest texture coordinates based on the longitude and the texture coordinates of a current first calibration point in the current first lens image associated with a current lens to assign a latitude of the nearest texture coordinates to the current first calibration point, wherein N>1;

(c) repeating step (b) until all the first calibration points in the current first lens image are processed; and (d) repeating steps (a) to (c) until all the first lens images for all the lenses are processed to create the link between the spherical coordinates and the texture coordinates.

11. The calibration method according to claim 10, further comprising:

(e) creating the N correspondence tables using a second N-lens camera after the step of installing and prior to the other steps, wherein N>1.

12. The calibration method according to claim 11, wherein step (e) comprises:

(e1) mounting the second N-lens camera on the rotation equipment;

(e2) causing the second N-lens camera to generate N second lens images for a current second spin angle by the rotation equipment whenever the second N-lens camera spins a second stepping angle about the spin axis in a single direction, wherein N>1;

(e3) repeating step (e2) until the current second spin angle is equal to or greater than 360 degrees to obtain a plurality of second lens images for different second spin angles;

(e4) determining texture coordinates of a plurality of second calibration points for a current second lens image;

(e5) determining a longitude of the second calibration points in the current second lens image according to its second spin angle;

(e6) respectively assigning different latitudes to different second calibration points in the current second lens image according to the positions of the lamps in the horizontal semicircle arc;

(e7) repeating steps (e4) to (e6) until all the second lens images for a current lens are processed to obtain one correspondence table; and (e8) repeating steps (e4) to (e7) until all the second lens images for all the N lenses are processed to obtain the N correspondence tables;

wherein the current second spin angle is the sum of the second stepping angles.

13. The calibration method according to claim 12, wherein each correspondence table associated with one individual lens comprises a plurality of slice correspondences, wherein each slice correspondence associated with one individual longitude comprises a plurality of point correspondences, and wherein each point correspondence associated with one individual second calibration point comprises a longitude, a latitude and the texture coordinates.

14. The calibration method according to claim 10, further comprising:

(f) performing at least one of interpolation and extrapolation over the longitude, the latitude and the texture coordinates of the existing first calibration points to obtain the longitude, the latitude and the texture coordinates of additional first calibration points for the current first lens image prior to step (d) and after step (c).

15. The calibration method according to claim 10, whether step (a) comprises:

selecting pixels with illumination values greater than a threshold as light pixels in the current first lens image;

gathering adjacent light pixels together to form light pixel groups;

separating qualified groups with a predefined size and a predefined shape from the other light pixel groups to define the qualified groups as the first calibration points;

obtaining the texture coordinates of a current first calibration point in the current first lens image by calculating the average texture coordinates of the light pixels in a corresponding qualified group;

repeating the step of obtaining the texture coordinates of the current first calibration point until all the first calibration points in the current first lens image are processed; and assigning a longitude to all the first calibration points in the current first lens image according to its corresponding first spin angle.

* * * * *